United States Patent [19]

Miller et al.

[11] Patent Number: 5,673,933
[45] Date of Patent: Oct. 7, 1997

[54] CANISTER ASSEMBLED FLUID FUELED INFLATOR

[75] Inventors: Harry W. Miller; Walter A. Moore; David P. Kosoff, all of Ogden; Kerry A. Cooke, Hooper; David J. Green, Brigham, all of Utah

[73] Assignee: Morton International, Inc., Chicago, Ill.

[21] Appl. No.: 565,332

[22] Filed: Nov. 30, 1995

[51] Int. Cl.$^6$ .................................... B60R 21/26
[52] U.S. Cl. ............... 280/736; 280/741; 53/403; 53/478; 220/361; 222/3
[58] Field of Search ............ 280/736, 737, 280/740, 741, 742; 220/361, 363, 364, 365, 4.27, 502; 222/3, 5; 53/403, 404, 453, 478, 319, 329.2

[56] References Cited

U.S. PATENT DOCUMENTS

| | | | |
|---|---|---|---|
| 3,362,129 | 1/1968 | Scherer et al. | 53/319 |
| 3,450,414 | 6/1969 | Kobori | 280/736 |
| 4,478,788 | 10/1984 | Rozmus et al. | 220/364 |
| 5,022,674 | 6/1991 | Frantom et al. | 280/737 |
| 5,060,973 | 10/1991 | Giovanetti | 280/736 |
| 5,078,422 | 1/1992 | Hamilton et al. | 280/736 |
| 5,196,669 | 3/1993 | Richardson | 280/736 |
| 5,330,730 | 7/1994 | Brede et al. | 280/736 |
| 5,360,232 | 11/1994 | Lowe et al. | 28/741 |
| 5,441,302 | 8/1995 | Johnson et al. | 280/736 |
| 5,470,104 | 11/1995 | Smith et al. | 280/737 |
| 5,494,312 | 2/1996 | Rink | 280/737 |
| 5,566,853 | 10/1996 | Schenker et al. | 280/741 |

FOREIGN PATENT DOCUMENTS 616927  9/1994  European Pat. Off. ............ 280/736

*Primary Examiner*—Brian L. Johnson
*Assistant Examiner*—Peter C. English
*Attorney, Agent, or Firm*—Henry W. Tarring, II; Gerald K. White

[57] ABSTRACT

A unitary storage structures for the fluid components of a inflator of a vehicular airbag passive restraint system. The unitary storage structures facilitate the storage, testing, transportation and assembly of such components in the inflator. Advantageous methods of filling the storage chambers and of testing the filled structures for leaks prior to their transportation and assembly into the inflator housing are also disclosed.

18 Claims, 2 Drawing Sheets

CANISTER ASSEMBLED FLUID FUELED INFLATOR

BACKGROUND OF THE INVENTION

Inflatable restraint systems, commonly referred to as airbag systems, have become very popular in modern motor vehicles. These systems deploy automatically in the event of a collision to shield and cushion the occupants of a vehicle from the hard surfaces within its passenger compartment. Airbag systems comprise a folded airbag cushion which, when activated by a signal from a crash sensing device, inflates with gas supplied from a gas generator, or inflator. Many types of inflators have been disclosed. Such inflators need to be capable of releasing a sufficient quantity of non-toxic gas to inflate the airbag in a very short period of time. Additionally, the inflator needs to provide a high degree of reliability over the extended temperature range in which modern vehicles are expected to operate, and over the extended lifetime of the vehicle.

One of the disclosed inflator designs relies on a stored compressed gas which is released to inflate the airbag. Another design relies on the ignition of a solid gas generating material to produce a sufficient quantity of gas to inflate the airbag. A third type of inflator relies on the combination of a stored compressed gas and the combustion of a solid gas generating material. While these designs are functional to provide the gas needed to inflate an airbag, they each have disadvantages. The designs which rely on compressed gas must provide a relatively strong gas storage container, the thick walls of which increase the weight and bulk of the airbag assembly, a concern to vehicle manufacturers who usually seek to minimize vehicle weight. The designs which rely on the ignition of a solid gas generant material often result in a generated gas which contains solid particulate material at elevated temperature which requires further conditioning, such as filtering and cooling, of the gas before it encounters the fabric cushion of the airbag assembly.

Some of the more recent inflator designs rely on the combustion of fluid fuels heating inert gases which, in addition to lowering manufacturing costs, offer advantages such as little or no solid particulate matter, relatively low temperatures and relatively low concentrations of products of incomplete combustion in the product gases. Some of these designs are more fully described in U. S. patent application Ser. No. 08/252,036, entitled FLUID FUELED AIR BAG INFLATOR, filed by Bradley W. Smith and Karl K. Rink on May 31, 1994, now Pat. No. 5,470,104, and which is commonly assigned with this application. Application Ser. No. 08/252,036 is hereby incorporated by reference herein. U.S. Pat. No. 5,441,302 to a PISTON-ACTUATED AIR BAG INFLATOR WITH HERMETIC LINER, also commonly assigned with this application, describes further inflators which can use fluid fuels and inert gases. In the inflators described in this patent, thin-walled hermetic liners contain inert gases or combustible mixtures of fluid fuel and oxidant until the liner is crushed by a piston during activation of the inflator.

A need exists, however, to improve the design of the known fluid fueled inflators to provide structural characteristics which permit simplified assembly procedures. A need also exists to provide enhanced storage reliability of the fluid materials relied on in fluid fueled inflators.

SUMMARY OF THE INVENTION

A general object of the present invention is to provide a low cost fluid fueled inflator design which permits a simplified assembly procedure.

A corresponding object of the invention is the provision of a simplified procedure for assembling inflators according to the newly developed design.

A further object of the invention is the provision of a fluid fueled inflator having separate self-contained storage chambers for the separately stored fluids used therein. Such separate self-contained storage chambers should be capable of being loaded and leak tested at locations apart from the inflator assembly area. The loaded chambers should then be capable of being transported to the inflator assembly area where they are assembled into inflators. This procedure eliminates the majority of in-line welding, filling and verification processes. Moreover, it provides for more accurate leak testing since such can be accomplished off-line and away from the relatively dirty on-line processes, such as welding, which can reduce leak test reliability.

DETAILED DESCRIPTION OF THE INVENTION

Figure 1:
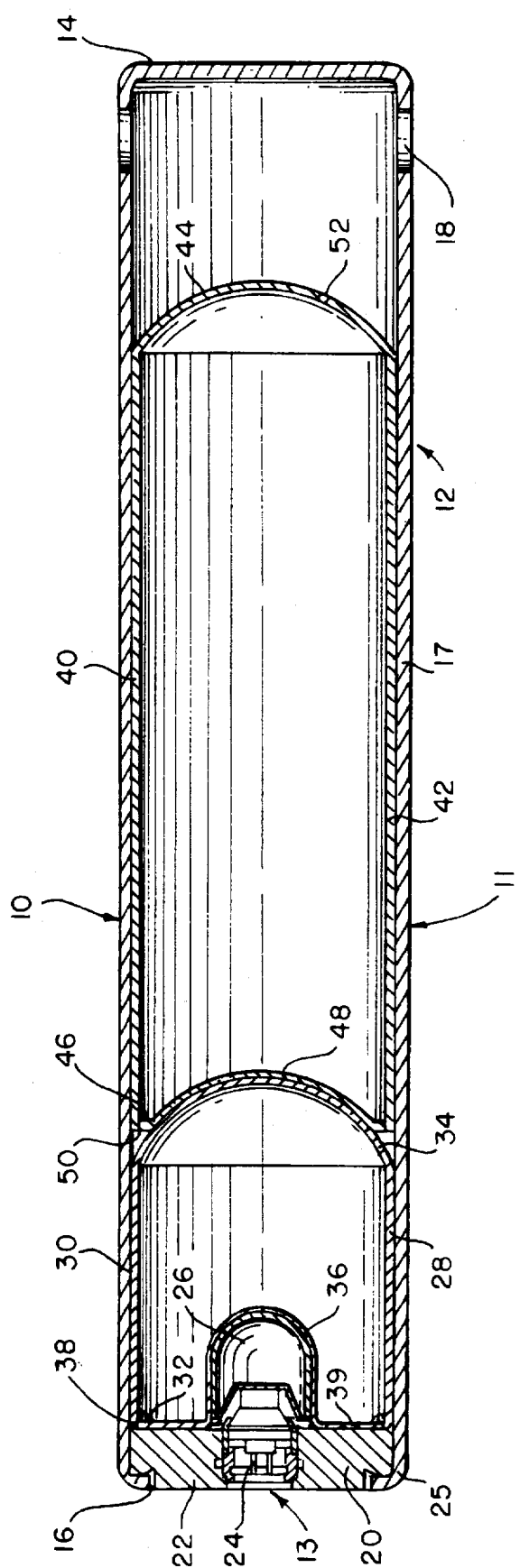
FIG. 1 is a side view of a gas generator, or inflator, according to the present invention.

FIG. 1 illustrates an inflator 10 having a housing 11, which, in the embodiment shown, has a receiving member 12 and a closing member 13. The receiving member 12 has a closed end 14 and an open end 16, with a side wall 17 extending between the ends. The housing is typically fabricated from metals, such as steel or aluminum, and includes gas exit ports 18. The gas exit ports 18 are arranged in a pattern which provides essentially neutral thrust during the gas production process, also referred to as deployment. The open end 16 of the receiving member 12 is closed by the closing member 13, which comprises an end closure assembly 20 providing an essentially gas tight seal of the open end of the receiving member during deployment. The end closure assembly 20 includes flange 22 and an initiator, or squib 24, mounted through a central opening in the flange 22. The end closure assembly is held in place against the oxidizer chamber 28 and fuel cup 26, described hereinafter, by a crimped portion 25 of the side wall 17 which extends over the rounded outer edge of flange 22. The end closure assembly 20 could also be joined to the receiving member 12 by a weld applied by any of the well known inertial, laser, MIG or TIG welding techniques.

A fuel cup 26, which is preloaded with a fluid fuel, is located directly in front of and partially surrounding squib 24. The fuel cup 26 is a unitary storage chamber fabricated from metal, ceramic or plastic, and having sufficient capacity to contain all of the fluid fuel required by the inflator.

Directly in front of and partially surrounding the fuel cup 26 is an oxidizer chamber 28 containing an oxidizing gas composition. The oxidizer chamber 28 is a unitary storage chamber fabricated from plastic, ceramic or metal. The oxidizer chamber 28 has a side wall 30 having exterior dimensions sufficiently smaller than the interior dimensions of the side wall 17 of the receiving member 12 to permit the oxidizer chamber to be inserted in the housing as a unit. The oxidizer side wall 30 extends between a closing flange 32 closing one end of the oxidizer chamber 28 and an integral dome 34 closing the other end of the chamber. Closing flange 32 includes a centrally located internally extending well structure 36, which is designed to partially surround fuel cup 26. The closing flange is joined around its periphery 38 to side wall 30 in a pressure tight manner, preferably by a method which involves partial melting and re-solidification, such as welding or brazing. A port 39 for filling the chamber with its oxidizing gas composition can be provided at any convenient location, such as on the closing flange 32.

An inert gas composition is provided in an inert gas canister 40 located directly in front of oxidizer chamber 28. The inert gas canister is also a unitary storage chamber fabricated from plastic, ceramic or metal. The canister has a side wall 42 extending between a forwardly extending dome 44 at the forward end of the canister, and an end closure plate 46 containing an internally extending dome 48 at the other end of the canister. The side walls 42 have a maximum dimension which permits the canister to be inserted in the receiving member 12 as a unit. The internally extending dome 48 provides a complimentary fit over the dome 34 of the oxidizer chamber 28. A sealing means, such as high temperature adhesive, provides a pressure seal between 34 and 48 to prevent impingement of combustion gases on the housing 11. The perimeter 50 of end closure plate 46 is sealed to the side wall 42 with a pressure tight seal, preferably by welding or brazing. A port 52 for filling the canister is provided at any convenient location, in the illustrated inflator it is provided on dome 44.

The domes 34, 44 and 48, as well as the dome in the fuel cup 26, are provided with a weakened section as a rupture area. Typically, such a weakened section is provided by providing breakage creases, or cruciforming, in the dome. Such weakened sections can also be established by providing welded rupture discs at appropriate locations on the respective domes and well.

When mounted in the airbag system of a motor vehicle involved in a sudden deceleration, such as that involved in a front end collision, the inflator would be activated by an electrical signal sent from a deceleration sensor (not shown) mounted elsewhere on the vehicle. The electrical signal is transmitted to the squib 24 causing it to fire, thereby raising the temperature and pressure of the fluid fuel in the fuel cup 26 to a condition where it ruptures the fuel cup and the internal well 36 of the recessed portion of the oxidizer chamber which creates a cavity for the fuel cup. The fuel and the oxidizing gases then ignite in the oxidizer chamber 28, rapidly increasing the temperature and pressure in that chamber resulting in the rupture of the oxidizer dome 34 and the complementary shaped internal dome 48 of the inert gas canister 40. The combustion products produced in the oxidizer chamber 28 then mix with and heat the inert gases provided in canister 40 causing the pressure of these gases to rise rupturing the canister dome 44 and allowing the resulting product gas to exit through the gas exit ports 18. Heating of the inert gases in canister 40 cools the combustion products produced from the oxidized fuel, resulting in a cooler generated gas product than would be produced in the absence of the inert gas component. The exiting resulting gases are directed to the interior of an airbag cushion causing it to rapidly expand into its intended deployed condition.

The inventive inflator design can be assembled by a simplified fabrication procedure which minimizes the number of operations required to be conducted during the inflator's final assembly, while providing a degree of fabrication control which minimizes the number of defective manufactured inflators. By providing the oxidizer chamber 28 and the inert gas canister 40 as unitary storage chambers, these chambers can be loaded with their respective gas compositions at locations remote from the inflator's final assembly line. Once loaded they can be leak tested individually, and defective chambers either discarded or recycled as appropriate. Those chambers which provide acceptable leak test results can then be transported to the inflator's final assembly line, where they are inserted, as a satisfactorily tested, filled unit, in the inflator housing. Once the chambers 28 and 40 are assembled in the housing, the fuel cup 26 is inserted, the end closure assembly is inserted in the receiving member 12 and a portion of the side wall 17 is crimped over the rounded outer edge of the closure flange 22.

In contrast, previous inflator assembly operations have required the oxidizer and inert gas chambers to be filled after the chambers have been fabricated in the inflator housing. Leak testing must be conducted on the chambers after they have been assembled in the housing, and any unsatisfactory leakage rates usually result in the necessity to either discard or recycle the assembled or partially assembled inflator structure. At such point the structure has considerably more material and labor invested in it than do the unitary storage chambers of the present invention. It should be apparent that, depending upon the particular prior inflator design and the degree of its completion at the time that an unacceptable leak rate is discovered, the number of assemblies that can be recycled rather than discarded is related to the accessibility of the leaking chamber. The present design provides for leakage rate testing at a time when the tested chamber is fully accessible, thereby maximizing the number of unsatisfactory storage chambers which can be recycled for corrective processing rather than being discarded.

Since the storage chambers are each hermetically sealed, the inflator housing 11 and the end closure assembly 20 do not need to be joined with a hermetic seal and can be joined by a less expensive mechanism. Specifically, the previously described procedure of merely crimping a portion of the receiving member's side wall 17 over a rounded outer edge of the closure flange 22 accomplishes an essentially leak tight and fully satisfactory closure of the housing. Of course, closure can be accomplished by other techniques, such as welding, however, these techniques usually require more extensive machinery and capital investment.

Figure 2:
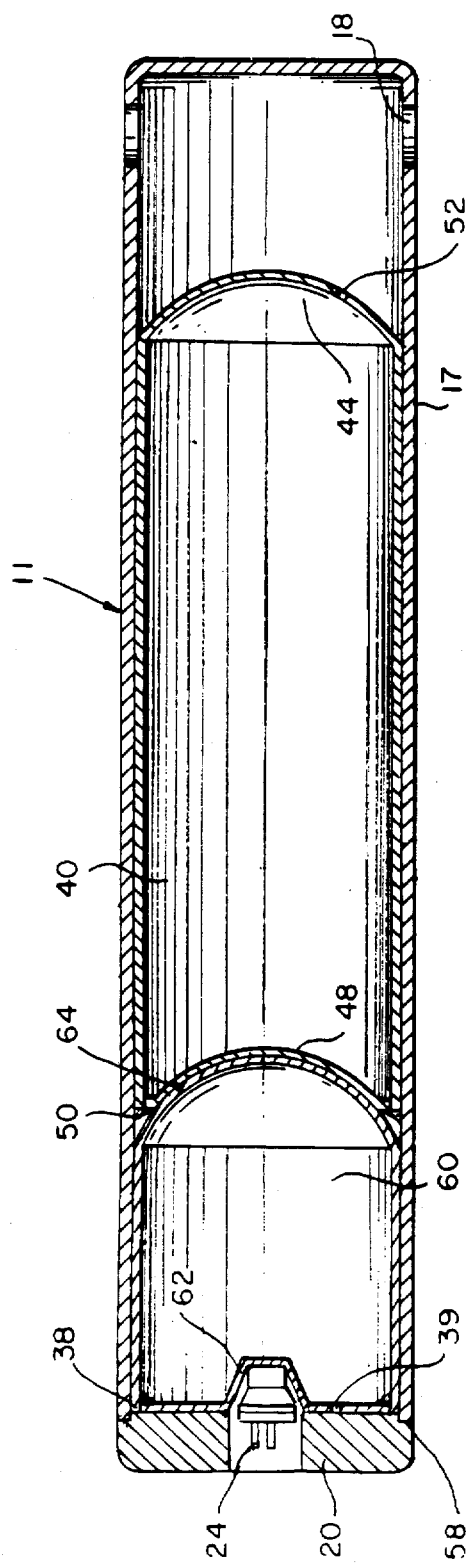
FIG. 2 is a side view of a further inflator according to the present invention.

The embodiment illustrated in FIG. 2 is similar to the embodiment of FIG. 1 and uses the same item numbers to designate similar parts thereof. The principal differences involve the use of a welded joint 58 to attach the end closure assembly 20 to the open end 16 of the receiving member 12; and the elimination of the fuel cup 26 by providing the fluid fuel as a mixture with an oxidant in storage chamber 60. The mixture of fuel with oxidant creates a combustible mixture which must be carefully controlled and handled. The relative ease of combustion can be modified by varying the ratio of fuel to oxidant, however, in the absence of a supplemental fuel source, such ratio needs to be maintained within a range at which combustion is possible, preferably in the fuel-lean, or oxygen-rich, range. This embodiment provides for a simpler assembly operation, due to its fewer components. It further assures complete mixing of the fuel and oxidant.

Upon activation of the initiator 24, combustion products are released into the surrounding recess 62 provided in storage chamber 60, causing a rupture area provided in such recess to burst. The combustion products from the initiator mix with the flammable mixture within the chamber 60, causing it to ignite and burst the rupture areas provided in dome 64 of chamber 60 and its mating dome 48 of the inert gas storage chamber 40. The combustion gases then mix with and heat the inert gas in storage chamber 40 causing such to expand and burst the rupture area provided in dome 44, allowing the generated gases to flow through the gas exit ports 18 and be directed to inflate the air bag cushion.

The unitary storage chambers can be fabricated from plastics, ceramics or metals. Plastic storage chambers provide long term chemical and physical stability, as well as relatively easy fabrication. Suitable plastics include thermoplastics, such as polystyrene and polycarbonate. Plastic storage chamber parts can be formed by injection molding, blow molding, extrusion, compression and rotational techniques. They can be joined by various welding and bonding techniques as well as by adhesives or suitable solvents which can be used to cause partial dissolution, followed by resolidification. The cruciformed rupture areas can be established in the domed portions of the chambers by the molds used in the molding process.

Storage chambers fabricated from ceramics, such as zirconia, provide strength and long term chemical stability. Such storage chamber parts are fabricated by preparing a pouring mix of the ceramic ingredients, forming the pouring mix to the intended shape, allowing the shaped article to dry at relatively low temperature to form a "green" shaped article, and baking the "green" article at high temperature to cure the ceramic. Ceramic parts can be joined by glass welding or brazing techniques. Cruciformed rupture areas are molded into the domes by providing a reduced thickness in the rupture area while providing a standard thickness in the remaining walls.

Metal storage chambers can be fabricated from metals, such as steel or aluminum, using standard impact forming and welding or brazing techniques. Cruciforming can be applied using a stamping device to place breakage creases of diminished wall thickness in the desired rupture zones. In steel storage chambers a typical wall thickness would be in the range of 0.04 to 0.10 inch, and preferably within the range of 0.07 to 0.09 inch, with a diminished wall thickness in the range of 0.01 to 0.03 inch, and preferably in the range of 0.015 to 0.020 inch, in the breakage crease.

The storage chambers should be designed to be structurally rigid and to provide for safe handling at the pressures at which their respective gas mixtures are to be stored, as well as at pressures at which they may be subject to testing by governmental authorities or others. It is not necessary, however, to design the chambers to be structurally rigid at the pressures expected to be encountered when the gas generator is activated during deployment of the airbag. At the time of deployment the storage chambers are loaded within the inflator housing 11 and are augmented or reinforced by such housing. Accordingly, the housing 11 should be designed to provide sufficient reinforcement to the storage chambers to assure their structural integrity during deployment. The chambers should possess sufficient structural integrity that substantial rigidity be demonstrated by those portions of the chamber other than those intended to rupture during deployment. The design strength of the storage chamber walls can permit them to expand into the interior wall of housing 11, such that they establish a substantially gas tight seal with the interior wall of the housing.

Figures 3A, 3B, 3C:
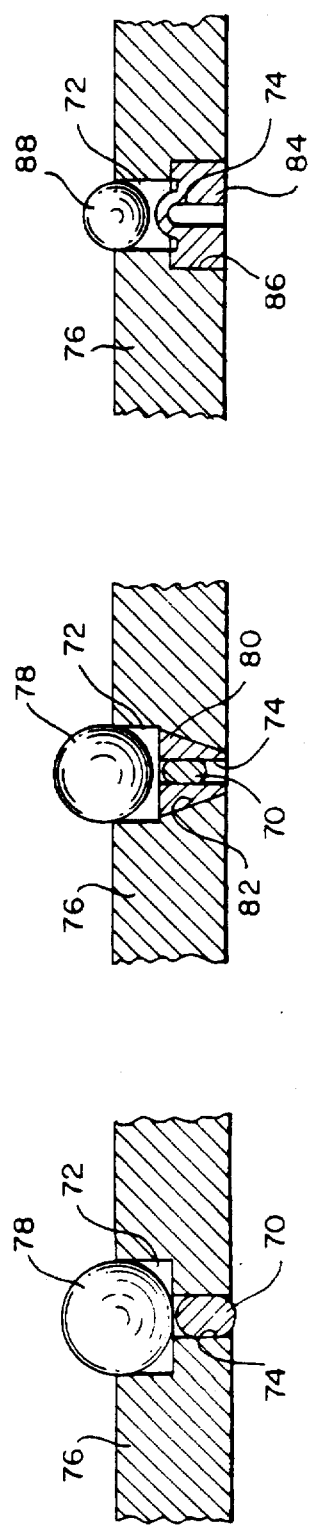
FIGS. 3A, 3B and 3C illustrate particularly advantageous closures for sealing containers, such as the described storage chambers, containing pressurized gases.

After fabrication, the storage chambers are filled with their respective gas mixtures. The filling operation typically involves injecting the gas mixture through a fill hole provided at a convenient location in the storage chamber wall and then sealing the chamber by plugging the fill hole with a slightly larger ball. A particularly advantageous method of filling containers has been developed which results in a seal corresponding to any one of the seals illustrated in FIGS. 3A, 3B or 3C. These seals are characterized by the formation of an initial seal at a relatively low temperature while the fill port is in the possibly hostile environment created by pressurized gas in the gas fill apparatus, followed by the formation of a permanent seal overlying the initial seal by a technique involving a relatively high temperature which can be accomplished after the fill port has been removed from the pressurized portion of the gas fill apparatus. The seals of FIGS. 3A and 3B are accomplished by feeding the container to a gas filling apparatus on a conveyor or other feeding apparatus. A plugging structure 70, such as the small metal round ball depicted, is fed to a recess 72 overlying the gas fill port 74 in the wall 76 of the container, and the port is aligned with and fluid communication established with a gas fill head, or nozzle. The plugging structure can be in the form of a ball or in the form of a pin, at least a portion of which is cylindrical having a diameter permitting it to establish a sealing relationship in said fill port once inserted therein. A small round magnetized or magnetizable rod having a diameter smaller than that of the round ball is then moved into place and lowered to magnetically mate with the round ball. The rod is then withdrawn slightly bringing the round ball with it, thereby opening the fill port to allow passage of pressurized gas into the chamber from the gas fill head. When the gas fill is completed, the rod is extended forcing the round ball into the fill port, slightly deforming it in the process and creating an essentially leak proof seal. A second somewhat larger round metal or plastic ball 78 which conforms to the outer larger diameter of the recess 72 is then inserted in the recess and welded or otherwise fixed to the adjoining wall of the container. When the chamber is being filled with a combustible gas, it is removed from the combustible environment within the gas fill apparatus before any welding or similar operations are performed. When the chamber is being filled with a pressurized inert gas, it is not necessary to remove the gas fill apparatus before initiating the welding step. A further safety advantage results from not attempting to weld the plugging structure to the chamber wall, instead welding the larger ball inserted in the recess where it is insulated from the combustible mixture within the chamber by the previously inserted plugging structure.

The plugging structure 70 is made from metal or plastic. If made from plastic it either includes additives to allow it to adhere to the magnetized rod, or such rod is provided with a different mechanism, such as a vacuum channel or a piercing point, to enable it to lift the plastic ball. It is preferred, but not required, that the material forming the plugging structure be less hard than the material through which the fill port 74 is located, resulting in the plugging structure 70, rather than the fill port 74, being slightly deformed during the sealing operation.

The method described above is essentially the same in forming the seals illustrated in both FIGS. 3A and 3B; however, the FIG. 3B embodiment provides the fill port 74 as a cavity extending between the ends of an insert 80 shaped to fit within a cavity, or bore 82, underlying the recess 72. Preferably, the bore is tapered inwardly as it extends through the container wall. Such bore may extend all the way through the container wall or it may provide a ledge by extending only partially through the wall with a smaller diameter port extending through the resulting ledge to the inside of the container. The insert 80 can be formed from either metal or plastic and, preferably, is formed from a material which is softer than the material used to form the container wall 76.

The seal illustrated in FIG. 3C is formed by press fitting or molding a plastic insert 84 containing the fill port 74 into a second recess 86 in the container wall 76 which is aligned with and larger than first recess 72. The container is aligned with the gas fill head and filled through the gas fill port 74. Once filled, the container is initially sealed by ultrasonically welding the gas fill port closed. Ultrasonic welding is accomplished by applying ultrasonic energy to a portion of the plastic insert surrounding the fill port until such portion melts and flows together blocking the fill port. Resolidification of the plastic essentially seals the fill port. The container can then be removed from the pressurized region of the gas fill apparatus and is permanently sealed by welding ball 88 in recess 72 to the container wall 76. This sealing technique is particularly suitable for use with metal containers, wherein the use of a plastic insert permits a welded initial seal at a temperature significantly lower than temperatures normally associated with metal welding techniques.

While the initial seal provided within the pressurized environment of the gas fill apparatus is capable of providing a leak proof seal, the permanent seal provided by welding the outer ball closure to the container wall assures that the initial seal does not migrate out of position, as well as providing a further, more securely affixed, i.e. welded, seal. The obtention of a leak proof seal over the extended lifetime expected of airbag assemblies intended for modern motor vehicles is thereby enhanced. We have found the use of metal balls to permanently seal metal storage chambers to be particularly efficient and effective.

After the storage chambers are filled with their respective gaseous mixtures, they are leak tested to determine whether their leakage rate is acceptable or not. Increasingly, airbag assemblies are designed to have a useful lifetime of at least fifteen years. While it has been said that it is impossible to provide a totally leak free container, the present storage containers must be virtually leak free in order to maintain sufficient gas in the storage containers to provide effective and sufficient inflation gas production after fifteen years. Those containers which demonstrate satisfactory leakage rates are transported to the gas generator assembly area. Typically such leakage rates must be less than about $5 \times 10^{-6}$ atm. cc./sec., preferably less than $3 \times 10^{-6}$ atm. cc./sec., and most preferably less than about $1 \times 10^{-7}$. The containers which demonstrate unsatisfactory leakage rates are either discarded or recycled, depending on the location and nature of the leak and the relative economies of discarding or recycling.

The fluid fuels that may be used in the present inflator include a wide range of gases, liquids and finely divided solids which when mixed in proper proportions with suitable oxidants form a flammable mixture. Such fuels include hydrogen; hydrocarbon-based fuels, such as methane, ethane, propane, butane, octane, gasoline and kerosene; hydrocarbon derivatives, such as alcohols, esters and ethers; finely divided solid materials, including carbonaceous materials, such as coal and charcoal; cellulosic materials such as wood, peat and cotton; food dusts such as starch, flour and grain dusts; carbonaceous polymers such as plastics, rubbers and resins; and metals such as magnesium, aluminum and titanium. The fluid fuel can include combinations of these fuels, as well as combinations with other materials, such as water. Particularly useful fuels include butane and ethanol.

When the fuel is provided in a separate container, such as fuel cup 26, the fuel can be selected to provide auto-ignition at an elevated temperature which is below that at which structural components in the inflator are significantly weakened and subject to failure. The selection of fuels to provide such functionality is more fully described in commonly owned application Ser. No. 08/382,559, filed Feb. 2, 1995, by Karl K. Rink, now U.S. Pat. No. 5,494,312, and which is hereby incorporated by reference. Application Ser. No. 08/382,559 teaches the further need to provide a fuel storage element having a specified rupture point temperature in order to provide the therein described sequence of auto-ignition operation. In the embodiment of present FIG. 1, the rupture point temperature of the oxidizer chamber well 36 should be controlled with that of the fuel storage element 26 if auto-ignition functionality of the fuel is intended.

The oxidizing gas mixture provided in the oxidizer chamber 28 must, of course, include an oxidant. Suitable oxidants include various oxygen-containing gases, such as air, pure oxygen, diluted air and oxygen combined with one or more diluents, such as nitrogen, carbon dioxide and inert gases such as helium and argon. Nitrous oxide, $N_2O$, is another suitable oxidizing agent, which can be used with a diluent, such as carbon dioxide. As mentioned previously, the oxidizing gas mixture could also include one or more fluid fuels. Typically, the oxidizing gas mixture will include helium for its detectability during leak testing. A particularly advantageous oxidizing gas mixture contains 60% oxygen, 30% argon and 10% helium, and is loaded in the oxidizer unitary storage chamber at a pressure between about 500 and 3000 psig, preferably between 2000 and 3000 psig. The oxygen/argon ratio of this mixture can be modified to tailor its ignition to particular desired conditions. When a liquid fuel, such as ethanol, is provided as a mixture with the oxidant, the storage pressure could range from 200 to 2000 psig.

The inert gas chamber 40 is filled with an inert gas, such as argon, nitrogen, helium or xenon, typically to a pressure in the range of 2000–4000 psig, preferably in the range of 3000 to 4000 psig. Usually the inert gas mixture will include at least a minor amount, about 2% to about 15%, and preferably about 2% to about 5%, of helium for its detectability in leak testing.

It should be appreciated that the preceding description is intended to provide a clear understanding of the invention. No unnecessary limitations should be assumed since modifications within the scope of the invention will be obvious to those of ordinary skill in the art. Accordingly, the scope of the invention should be determined based on the scope of the following claims.

We claim:

1. A method of filling a storage chamber with a fluid, comprising:

(a) providing a first cavity extending through a wall of said chamber;

(b) providing an insert structure having a side wall extending between two ends thereof, said side wall shaped to fit within said first cavity, and said insert structure having a second cavity extending between said two ends, (c) inserting said insert structure in said first cavity, (d) injecting said fluid into said storage chamber through said second cavity;

(e) closing said second cavity with an essentially leak tight seal;

(f) providing a plugging structure in at least one of said first cavity and said second cavity and between said essentially leak tight seal and the exterior of said storage chamber, and adjacent an adjoining portion of the wall of said storage chamber; and (g) welding said plugging structure to said adjoining portion of the wall of said storage chamber.

2. The method of claim 1, wherein the step of closing said second cavity comprises:

providing a pin having a cylindrical portion, and inserting said cylindrical portion of said pin in said second cavity.

3. The method of claim 1, wherein the step of closing said second cavity comprises:

providing a ball, and inserting said ball in said second cavity.

4. The method of claim 1, wherein the step of closing said second cavity comprises:

melting a portion of said insert structure surrounding said second cavity, and allowing the melted portion to flow together to a shape blocking said second cavity, and resolidifying said melted portion in said blocking shape.

5. The method of claim 4, further comprising:

providing said wall of said chamber from a metal, and providing said insert structure from a plastic.

6. The method of claim 4, wherein the step of melting a portion of said insert structure comprises:

applying ultrasonic energy to said insert structure.

7. A method of filling a storage chamber with a fluid, comprising:

(a) providing a first cavity extending through a wall of said chamber;

(b) providing an insert structure having a side wall extending between two ends thereof, said side wall being shaped to fit within said first cavity, and said structure having a second cavity extending between said two ends, (c) placing said insert structure in said first cavity, (d) injecting said fluid into said storage chamber through said second cavity;

(e) melting a portion of said insert structure surrounding said second cavity; allowing the melted portion to flow together to a shape blocking said second cavity, and re-solidifying said melted portion in said blocking shape to seal said second cavity.

8. The method of claim 7, wherein the step of melting a portion of said insert structure comprises:

applying ultrasonic energy to said insert structure.

9. The method of claim 7, wherein:

said insert structure is made from a plastic material.

10. In an inflator comprising:

a housing having a receiving member and a closing member, said housing having openings between the interior and the exterior thereof and containing:

a first storage chamber containing a pressurized oxidizing gas, a second storage chamber containing a pressurized inert gas, a fluid fuel, and initiator means for initiating burning of the fluid fuel;

wherein activation of said initiator means initiates burning of said fluid fuel with said oxidizing gas to produce heat and combustion products which mix with and heat said inert gas to provide a product gas which exits said housing through said openings;

the improvement wherein at least one of said storage chambers is a unitary structure which:

(a) is capable of containing the full charge of its respective stored gas, (b) has dimensions which allow it to be inserted in said receiving member prior to the joining of said receiving member with said closing member, and (c) comprises a side wall extending between a first end and a second end, said first end comprising an externally extending dome and said second end comprising an internally extending dome.

11. The inflator of claim 10, wherein both of said storage chambers are provided as unitary structures.

12. The inflator of claim 11, wherein the externally extending dome of the unitary structure comprising said first storage chamber fits within said internally extending dome of the unitary structure comprising said second storage chamber.

13. The inflator of claim 12, wherein the side walls of both of said unitary structures have essentially the same cross section.

14. The inflator of claim 10, wherein said fluid fuel is provided in a mixture with said oxidizing gas in said first storage chamber.

15. The inflator of claim 10, wherein said first storage chamber contains an oxidizing gas mixture comprising an oxidant and an inert gas.

16. The inflator of claim 10, wherein said first end is integral with said side wall and said second end is joined to said side wall.

17. The inflator of claim 10, wherein each of said domes includes a rupture area having diminished strength in relation to said side wall.

18. The inflator of claim 17, wherein said rupture area in at least one of said domes includes a cruciform structure.

* * * * *